(12) United States Patent
Martino et al.

(10) Patent No.: US 11,595,521 B2
(45) Date of Patent: *Feb. 28, 2023

(54) SYSTEM FOR COMMUNICATING EVENT AND LOCATION INFORMATION

(71) Applicant: K.Mizra LLC, Los Angeles, CA (US)

(72) Inventors: Monica Rose Martino, McKinney, TX (US); Michael Gregory Smith, Fairview, TX (US)

(73) Assignee: K.Mizra LLC, Cape Coral, FL (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/402,106

(22) Filed: Aug. 13, 2021

(65) Prior Publication Data

US 2022/0038576 A1 Feb. 3, 2022

Related U.S. Application Data

(63) Continuation of application No. 16/598,810, filed on Oct. 10, 2019, now Pat. No. 11,122,162, which is a
(Continued)

(51) Int. Cl.
*H04M 3/51* (2006.01)
*G08B 25/08* (2006.01)
(Continued)

(52) U.S. Cl.
CPC .......... *H04M 3/5116* (2013.01); *G01S 19/17* (2013.01); *G08B 25/016* (2013.01); *G08B 25/08* (2013.01);
(Continued)

(58) Field of Classification Search
CPC .......... H04M 3/5116; H04M 3/42357; H04M 7/006; H04M 11/04; H04M 2242/14;
(Continued)

(56) References Cited

U.S. PATENT DOCUMENTS 4,310,726 A 1/1982 Asmuth
4,893,325 A 1/1990 Pankonen et al.
(Continued)

FOREIGN PATENT DOCUMENTS

WO 0233897 A3 7/2002

OTHER PUBLICATIONS

"The Evolution of OnStar", "The Evolution of OnStar," Sep. 19, 2016, Sep. 19, 2016.
(Continued)

*Primary Examiner* — Mohamed A Kamara
(74) *Attorney, Agent, or Firm* — Kinney & Lange, P.A.

(57) ABSTRACT

The present invention provides a system, method and apparatus for initiating and handling an emergency IP request using an IP enabled device having GPS capability. The IP enabled device is monitored for one or more emergency criteria. If the emergency criteria are satisfied, global positioning data is obtained using the GPS capability and the emergency IP request is sent to an address server. The address server receives the emergency IP request, obtains local emergency services data based on the global positioning data, dials a call center station based on the local emergency services data and passes an emergency call from the IP enabled device to the call center station. This invention can be implemented as a computer program embedded in a computer readable medium wherein the steps are performed by one or more code segments.

20 Claims, 11 Drawing Sheets

Related U.S. Application Data continuation of application No. 15/652,539, filed on Jul. 18, 2017, now Pat. No. 10,498,891, which is a continuation of application No. 14/994,894, filed on Jan. 13, 2016, now Pat. No. 9,729,714, which is a continuation of application No. 11/488,271, filed on Jul. 18, 2006, now Pat. No. 9,282,187, which is a continuation-in-part of application No. 11/142,722, filed on Jun. 1, 2005, now Pat. No. 7,394,423, which is a continuation of application No. 10/690,346, filed on Oct. 21, 2003, now Pat. No. 6,927,727.

(60) Provisional application No. 60/701,274, filed on Jul. 21, 2005, provisional application No. 60/441,632, filed on Jan. 21, 2003.

(51) Int. Cl.
  *H04M 3/42* (2006.01)
  *G08B 25/00* (2006.01)
  *H04M 7/00* (2006.01)
  *G01S 19/17* (2010.01)
  *G08B 25/01* (2006.01)
  *H04M 11/04* (2006.01)

(52) U.S. Cl.
  CPC ....... *H04M 3/42357* (2013.01); *H04M 7/006* (2013.01); *H04M 11/04* (2013.01); *G08B 25/006* (2013.01); *G08B 25/009* (2013.01); *H04M 2242/14* (2013.01)

(58) Field of Classification Search
  CPC ....... G01S 19/17; G08B 25/016; G08B 25/08; G08B 25/006; G08B 25/009; H04L 67/52; H04W 4/025; H04W 4/90
  See application file for complete search history.

(56) References Cited

U.S. PATENT DOCUMENTS

| | | | |
|---|---|---|---|
| 5,210,540 A | 5/1993 | Masumoto | |
| 5,249,223 A | 9/1993 | Vanacore | |
| 5,479,482 A | 12/1995 | Grimes | |
| 5,650,770 A | 7/1997 | Schlager et al. | |
| 5,835,907 A | 11/1998 | Newman | |
| 5,873,040 A | 2/1999 | Dunn et al. | |
| 5,914,675 A | 6/1999 | Tognazzini | |
| 6,078,804 A | 6/2000 | Alperovich et al. | |
| 6,104,712 A | 8/2000 | Robert et al. | |
| 6,141,341 A | 10/2000 | Jones et al. | |
| 6,204,768 B1 | 3/2001 | Kosugi et al. | |
| 6,240,285 B1 | 5/2001 | Blum et al. | |
| 6,259,695 B1 | 7/2001 | Ofek | |
| 6,298,229 B1 | 10/2001 | Tomlinson et al. | |
| 6,340,928 B1 | 1/2002 | McCurdy | |
| 6,427,001 B1 | 7/2002 | Contractor et al. | |
| 6,463,287 B1 | 10/2002 | Wegner | |
| 6,600,914 B2 | 7/2003 | Uhlik et al. | |
| 6,675,081 B2 | 1/2004 | Shuman et al. | |
| 6,678,357 B2 | 1/2004 | Stumer et al. | |
| 6,678,612 B1 | 1/2004 | Khawam | |
| 6,751,452 B1 | 6/2004 | Kupczyk et al. | |
| 6,771,742 B2 | 8/2004 | McCalmont et al. | |
| 6,847,892 B2 | 1/2005 | Zhou et al. | |
| 6,868,074 B1 | 3/2005 | Hanson | |
| 6,909,964 B2 | 6/2005 | Armstrong et al. | |
| 6,927,727 B2 | 8/2005 | Cleghorn | |
| 7,120,488 B2 | 10/2006 | Nova et al. | |
| 7,215,638 B1 | 5/2007 | Joslyn et al. | |
| 7,286,648 B1 | 10/2007 | Chang et al. | |
| 7,394,423 B2 | 7/2008 | Martino | |
| 7,532,157 B2 | 5/2009 | Martino | |
| 9,282,187 B1 | 3/2016 | Martino et al. | |
| 10,498,891 B1 | 12/2019 | Martino et al. | |
| 2001/0010541 A1 | 8/2001 | Fernandez et al. | |
| 2001/0026223 A1 | 10/2001 | Menard et al. | |
| 2002/0118796 A1 | 8/2002 | Menard et al. | |
| 2002/0169584 A1 | 11/2002 | Fu et al. | |
| 2003/0012344 A1 | 1/2003 | Agarwal et al. | |
| 2003/0109245 A1 | 6/2003 | McCalmont et al. | |
| 2003/0186709 A1 | 10/2003 | Rhodes et al. | |
| 2004/0008253 A1 | 1/2004 | Monroe | |
| 2004/0088345 A1 | 5/2004 | Zellner et al. | |
| 2004/0247086 A1* | 12/2004 | Menard | H04L 63/08 379/37 |

OTHER PUBLICATIONS

Barabba V, "A Multimethod Approach for Creating New Business Models: The General Motors OnStar Project", V. Barabba, "A Multimethod Approach for Creating New Business Models: The General Motors OnStar Project," The General Motors OnStar Project, vol. 32, No. 1, Jan.-Feb. 2002, pp. 20-34, Jan. 2002, 20-34.
Beel, J , "Dergsm—Schutzengel", J. Beel, "Dergsm—Schutzengel," https://gsm-schutzengel.de/gsm-projekt0.shtml, Jun. 17, 2020., Jun. 2020.
Gabler, Hampton Clay, "Development of a Low-Cost Automated Crash Notification System", Jul. 2001.
Rogers, D , "Evolving Telematics Systems and Standards", D. Rogers, "Evolving Telematics Systems and Standards," 2000, 2000.
Shulzrinne , "Providing Emergency Call Services for SIP-based Internet Telephony", Jul. 2000.
Zhao Y, "Telematics: Safe and Fun Driving", Y. Zhao, "Telematics: Safe and Fun Driving," IEEE Intelligent systems, 2002, 2002.
Exhibit 1001—U.S. Pat. No. 7,394,423—*Unified Patents, LLC.* v. *K. Mizra, LLC*, Case IPR2022-00166 (PTAB, Nov. 11, 2021).
Exhibit 1002—U.S. Appl. No. 11/142,722 File History—*Unified Patents, LLC.* v. *K. Mizra, LLC*, Case IPR2022-00166 (PTAB, Nov. 11, 2021).
Exhibit 1003—Declaration of Anthony Wechselberger—*Unified Patents, LLC.* v. *K. Mizra, LLC*, Case IPR2022-00166 (PTAB, Nov. 11, 2021).
Exhibit 1004—U.S. Pat. No. 6,771,742—*Unified Patents, LLC.* v. *K. Mizra, LLC*, Case IPR2022-00166 (PTAB, Nov. 11, 2021).
Exhibit 1005—U.S. Pat. No. 6,868,074—*Unified Patents, LLC.* v. *K. Mizra, LLC*, Case IPR2022-00166 (PTAB, Nov. 11, 2021).
Exhibit 1006—U.S. Pat. No. 7,286,648—*Unified Patents, LLC.* v. *K. Mizra, LLC*, Case IPR2022-00166 (PTAB, Nov. 11, 2021).
Exhibit 1007—U.S. Pat. No. 5,210,540—*Unified Patents, LLC.* v. *K. Mizra, LLC*, Case IPR2022-00166 (PTAB, Nov. 11, 2021).
Exhibit 1008—WO2002033897—*Unified Patents, LLC.* v. *K. Mizra, LLC*, Case IPR2022-00166 (PTAB, Nov. 11, 2021).
Exhibit 1009—U.S. Pat. No. 5,249,223—*Unified Patents, LLC.* v. *K. Mizra, LLC*, Case IPR2022-00166 (PTAB, Nov. 11, 2021).
Exhibit 1010—U.S. Pat. No. 4,310,726—*Unified Patents, LLC.* v. *K. Mizra, LLC*, Case IPR2022-00166 (PTAB, Nov. 11, 2021).
Exhibit 1011—U.S. Pat. No. 4,893,325—*Unified Patents, LLC.* v. *K. Mizra, LLC*, Case IPR2022-00166 (PTAB, Nov. 11, 2021).
Exhibit 1012—"Revision of the Commission's Rules to Ensure Compatibility with Enhanced 911 Emergency Calling Systems"—*Unified Patents, LLC.* v. *K. Mizra, LLC*, Case IPR2022-00166 (PTAB, Nov. 11, 2021).
Exhibit 1013—"E-911 Location standards and location commercial services," Wang et al.—*Unified Patents, LLC.* v. *K. Mizra, LLC*, Case IPR2022-00166 (PTAB, Nov. 11, 2021).
Exhibit 1014—"Providing Emergency Services in Internet Telephony" Schulzrinne et al.—*Unified Patents, LLC.* v. *K. Mizra, LLC*, Case IPR2022-00166 (PTAB, Nov. 11, 2021).
Exhibit 1015—Resume of Weschselberger, Anthony—*Unified Patents, LLC.* v. *K. Mizra, LLC*, Case IPR2022-00166 (PTAB, Nov. 11, 2021).
Exhibit 1016—"Reading Law" by Scalia and Garner—*Unified Patents, LLC.* v. *K. Mizra, LLC*, Case IPR2022-00166 (PTAB, Nov. 11, 2021).
Exhibit 1017—U.S. Pat. No. 6,204,768—*Unified Patents, LLC.* v. *K. Mizra, LLC*, Case IPR2022-00166 (PTAB, Nov. 11, 2021).
Exhibit 1018—U.S. Pat. No. 5,650,770—*Unified Patents, LLC.* v.

(56) References Cited

OTHER PUBLICATIONS

*K. Mizra, LLC*, Case IPR2022-00166 (PTAB, Nov. 11, 2021).
Exhibit 1019—U.S. Pat. No. 6,847,892—*Unified Patents, LLC.* v. *K. Mizra, LLC*, Case IPR2022-00166 (PTAB, Nov. 11, 2021).
Exhibit 1020—"Random House Webster's Computer & Internet Dictionary Third Edition" by Philip E. Margolis—*Unified Patents, LLC.* v. *K. Mizra, LLC*, Case IPR2022-00166 (PTAB, Nov. 11, 2021).
Exhibit 1021—Declaration of Kevin Jakel—*Unified Patents, LLC.* v. *K. Mizra, LLC*, Case IPR2022-00166 (PTAB, Nov. 11, 2021).
*Unified Patents, LLC.* v. *K. Mizra, LLC*, Case IPR2022-00166 (PTAB, Nov. 11, 2021).

* cited by examiner

8. Generic routing of IP911 w/GPS data.

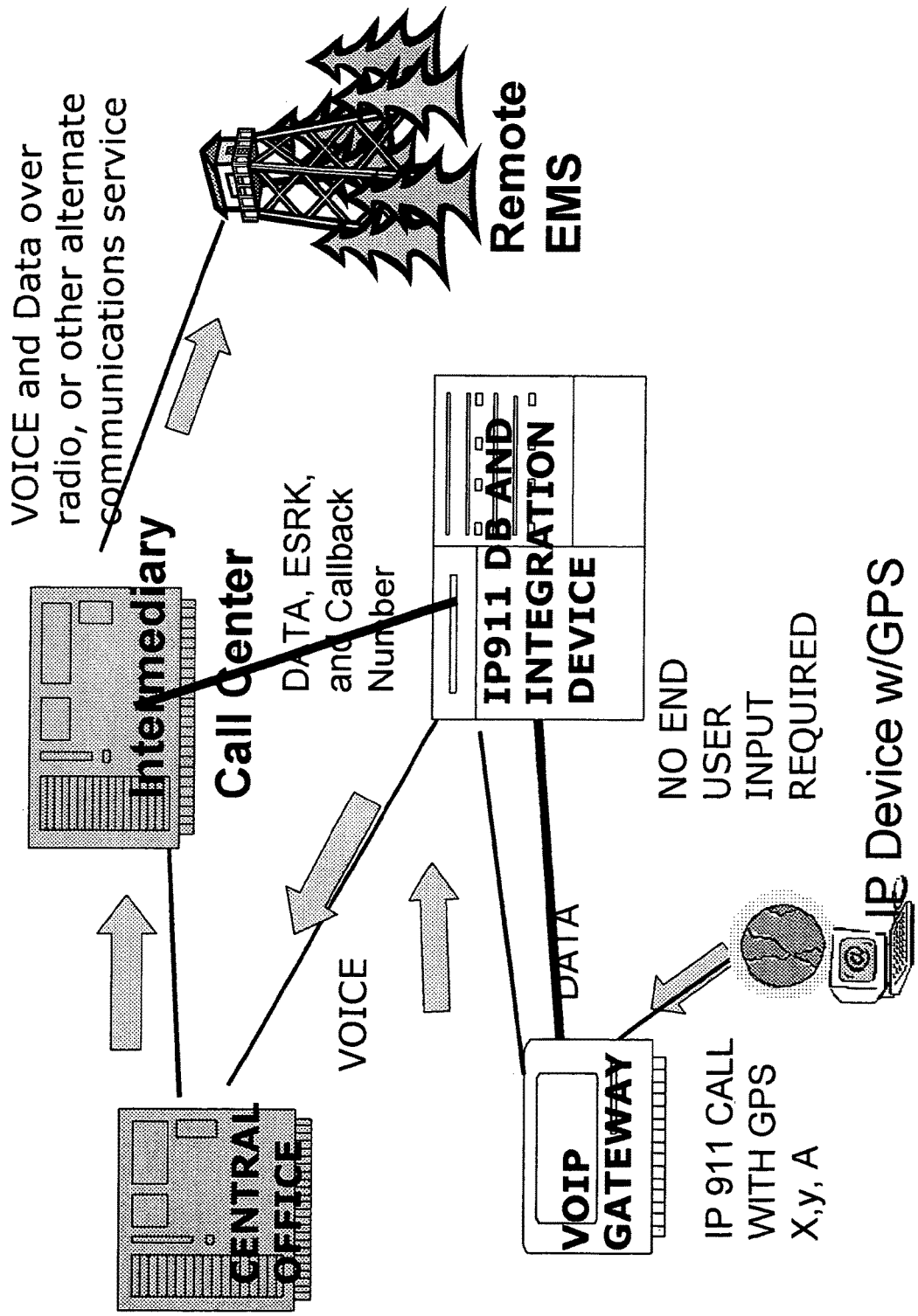

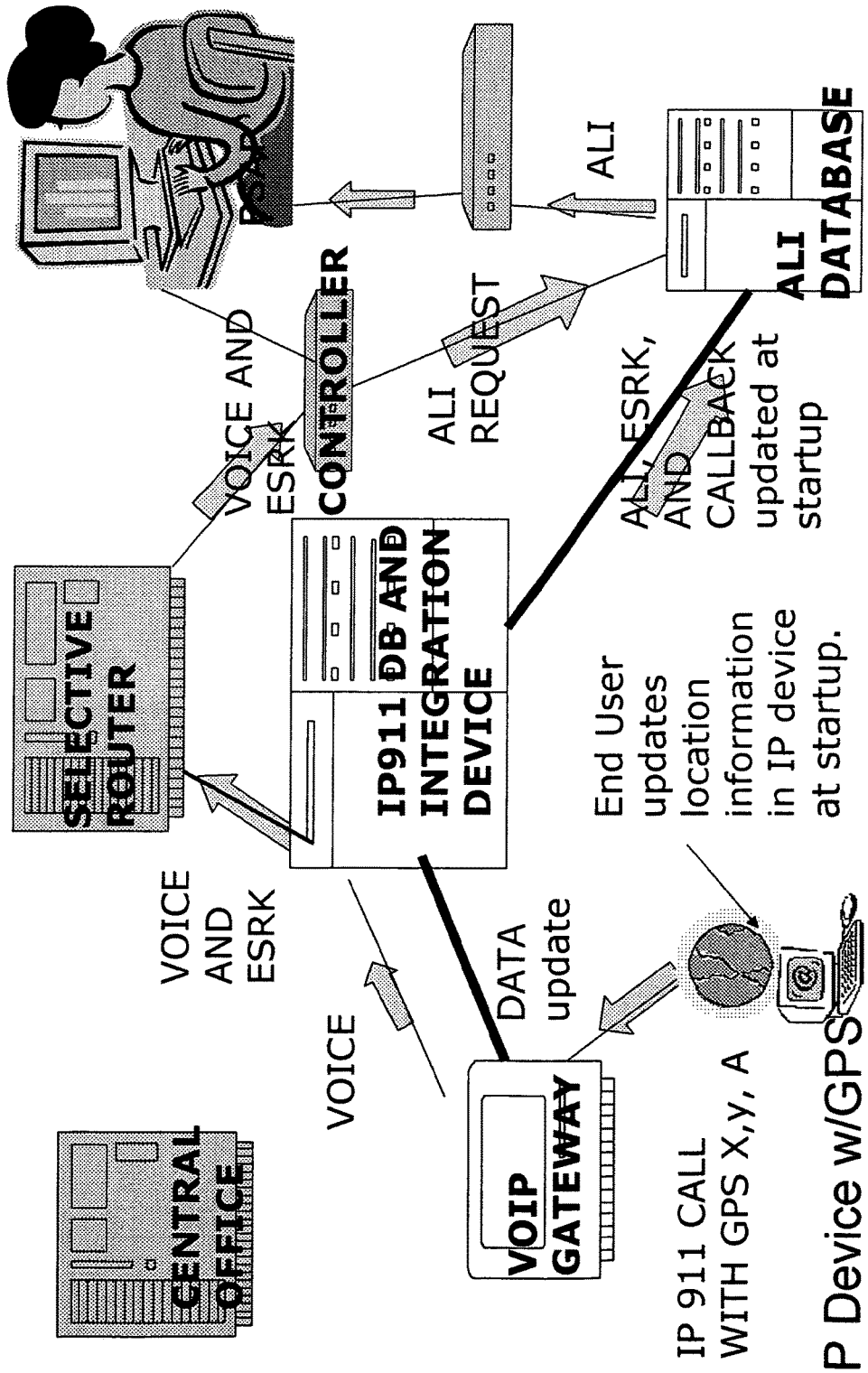

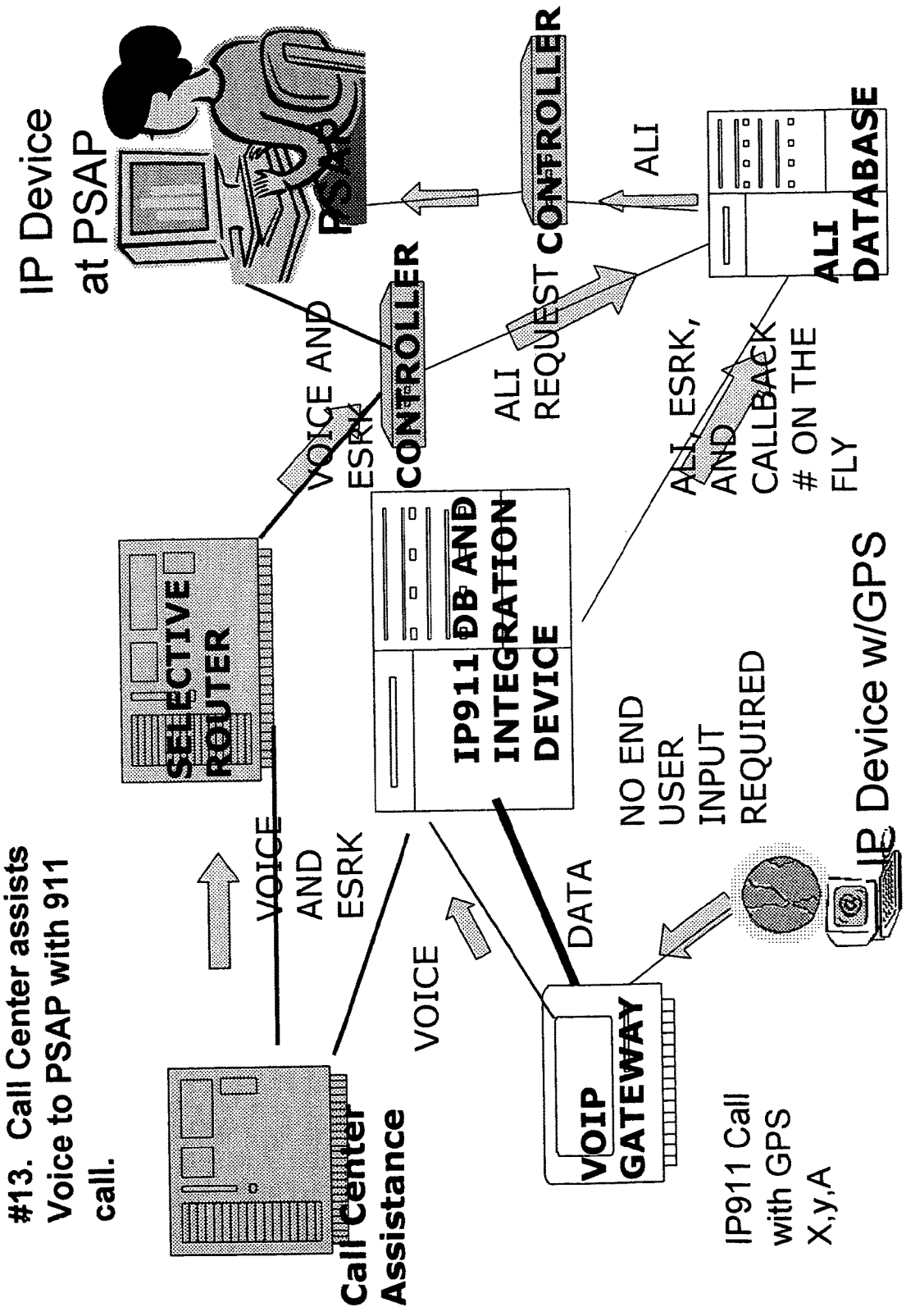

SYSTEM FOR COMMUNICATING EVENT AND LOCATION INFORMATION

CROSS-REFERENCE TO RELATED APPLICATIONS

The present patent application is a continuation of patent application Ser. No. 16/598,810, entitled SYSTEM FOR COMMUNICATING EVENT AND LOCATION INFORMATION, which is a continuation of patent application Ser. No. 15/652,539, entitled INTERNET PROTOCOL BASED 911 SYSTEM, which is a continuation of patent application Ser. No. 14/994,894, filed Jan. 13, 2016, issued as U.S. Pat. No. 9,729,714 on Aug. 8, 2017, entitled INTERNET PROTOCOL BASED 911 SYSTEM, which is a continuation of patent application Ser. No. 11/488,271, filed Jul. 18, 2006, entitled INTERNET PROTOCOL BASED 911 SYSTEM, issued as U.S. Pat. No. 9,282,187 on Mar. 8, 2016, which claims priority from patent application Ser. No. 60/701,274, filed Jul. 21, 2005, entitled INTERNET PROTOCOL BASED 911 SYSTEM, the entire contents of which are incorporated by reference herein. Patent application Ser. No. 11/488,271 is a continuation-in-part of and claims priority from patent application Ser. No. 11/142,722, filed Jun. 1, 2005, entitled INTERNET PROTOCOL BASED 911 SYSTEM, issued as U.S. Pat. No. 7,394,423 on Jul. 1, 2008. Patent application Ser. No. 11/488,271 is a continuation-in-part of and claims priority from patent application Ser. No. 11/142,723, filed Jun. 1, 2005, entitled INTERNET PROTOCOL BASED 911 SYSTEM, issued as U.S. Pat. No. 7,532,157 on May 12, 2009. Patent application Ser. No. 11/142,722 is a continuation of patent application Ser. No. 10/690,346, filed Oct. 21, 2003, entitled INTERNET PROTOCOL BASED 911 SYSTEM, issued as U.S. Pat. No. 6,927,727 on Aug. 9, 2005, which claims priority of provisional patent application Ser. No. 60/441,632, filed on Jan. 21, 2003, entitled INTERNET PROTOCOL BASED 911 SYSTEM, the entire contents of which are incorporated by reference herein. Patent application Ser. No. 11/142,723 is a continuation of patent application Ser. No. 10/690,346, filed Oct. 21, 2003, entitled INTERNET PROTOCOL BASED 911 SYSTEM, issued as U.S. Pat. No. 6,927,727 on Aug. 9, 2005, which claims priority of provisional patent application Ser. No. 60/441,632, filed on Jan. 21, 2003, entitled INTERNET PROTOCOL BASED 911 SYSTEM, the entire contents of which are incorporated by reference herein.

BACKGROUND

There are many systems for providing 911 services to cellular phones. But these systems are not designed to work in Internet Protocol ("IP") or voice over IP ("VoIP") systems. These systems do not have no way to match a location or address to an IP address because an IP address does not have a physical address or telephone number associated with it. Accordingly, there is a need for an IP based 911.

SUMMARY

The present invention provides software applications that communicate with Global Positioning Systems ("GPS") hardware embedded in Internet Protocol ("IP") enabled equipment such that when the equipment is used to access emergency services by entering 911 or pressing an emergency activation button, the software provides the means to determine the location of the calling equipment to the respective emergency service center appropriate to the location of the emergency. More specifically, the software monitors the voice over IP ("VoIP") software installed on the IP enabled equipment. When 911 is entered, the software acquires the vertical and horizontal coordinates ("V&H") from the GPS hardware, overrides the installed VoIP software to send a Session Initiation Protocol ("SIP") request to an address server which is also monitoring the Internet for these specific sessions. The address server accepts the SIP from the originating hardware, receives the V&H and accesses a database that cross references emergency services direct dial numbers with the V&H. The address server passes the voice call and the available direct dial numbers to a call center that handles emergency voice interface with the person who entered 911 at the originating equipment. The call center operator chooses which emergency service to dial after speaking with the person who has the emergency, or defaults to the fire rescue number.

The present invention is applicable to both wireline and IP telephony systems, such as laptop computers, PDAs, etc. The present invention does not rely on a set IP address, so that it will work on virtual networks and with transactional IP addresses. GPS coordinates are cross referenced to the closest physical emergency services. For example, the system may provide four numbers or more number to the operator (police, fire, poison control, emergency medical services, rescue, etc.). The operator selects the appropriate number and routes the call via PSTN or directly to the IP address. Note that this invention does not required fixed equipment and is primarily designed for stationary or portable voice or IP enabled devices rather than mobile phones. The present invention completes the IP telephony service.

The present invention provides a method for initiating an emergency IP request using an IP enabled device having GPS capability. The method includes monitoring the IP enabled device for one or more emergency criteria, and obtaining global positioning data using the GPS capability and sending the emergency IP request whenever the one or more emergency criteria are satisfied. This method can be implemented as a computer program embedded in a computer readable medium wherein the steps are performed by one or more code segments.

The present invention also provides a method for handling an emergency IP request from an IP enabled device having GPS capability. The method includes receiving the emergency IP request containing global positioning data for the IP enabled device, obtaining local emergency services data based on the global positioning data, dialing a call center station based on the local emergency services data and passing an emergency call from the IP enabled device to the call center station. This method can be implemented as a computer program embedded in a computer readable medium wherein the steps are performed by one or more code segments.

In addition, the present invention provides an apparatus having an IP enabled device, a GPS component within the IP enabled device and an emergency IP component within the IP enabled device. The emergency IP component monitors the IP enabled device for one or more emergency criteria, and obtains global positioning data from the GPS component and sends the emergency IP request whenever the one or more emergency criteria are satisfied.

Moreover, the present invention provides a system having an address server and a database communicably coupled to the address server. The address server receives an emergency IP request containing global positioning data for an IP enabled device, obtains local emergency services data based on the global positioning data and provides emergency information to one or more emergency services based on the local emergency services data.

Other features and advantages of the present invention will be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which:

FIG. 10 depicts an eighth IP based 911 system in accordance with one embodiment of the present invention;

FIG. 11 depicts a ninth IP based 911 system in accordance with one embodiment of the present invention; and FIG. 12 depicts a tenth IP based 911 system in accordance with one embodiment of the present invention.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides software applications that communicate with Global Positioning Systems ("GPS") hardware embedded in Internet Protocol ("IP") enabled equipment such that when the equipment is used to access emergency services by entering 911 or pressing an emergency activation button, the software provides the means to determine the location of the calling equipment to the respective emergency service center appropriate to the location of the emergency. More specifically, the software monitors the voice over IP ("VoIP") software installed on the IP enabled equipment. When 911 is entered, the software acquires the vertical and horizontal coordinates ("V&H") from the GPS hardware, overrides the installed VoIP software to send a Session Initiation Protocol ("SIP") request to an address server which is also monitoring the Internet for these specific sessions. The address server accepts the SIP from the originating hardware, receives the V&H and accesses a database that cross references emergency services direct dial numbers with the V&H. The address server passes the voice call and the available direct dial numbers to a call center that handles emergency voice interface with the person who entered 911 at the originating equipment. The call center operator chooses which emergency service to dial after speaking with the person who has the emergency, or defaults to the fire rescue number.

The present invention is applicable to both wireline and IP telephony systems, such as laptop computers, PDAs, etc. The present invention does not rely on a set IP address, so that it will work on virtual networks and with transactional IP addresses. GPS coordinates are cross referenced to the closest physical emergency services. For example, the system may provide four numbers or more number to the operator (police, fire, poison control, emergency medical services, rescue, etc.). The operator selects the appropriate number and routes the call via PSTN or directly to the IP address. Note that this invention does not required fixed equipment and is primarily designed for stationary or portable voice or IP enabled devices rather than mobile phones. The present invention completes the IP telephony service.

Figure 1:
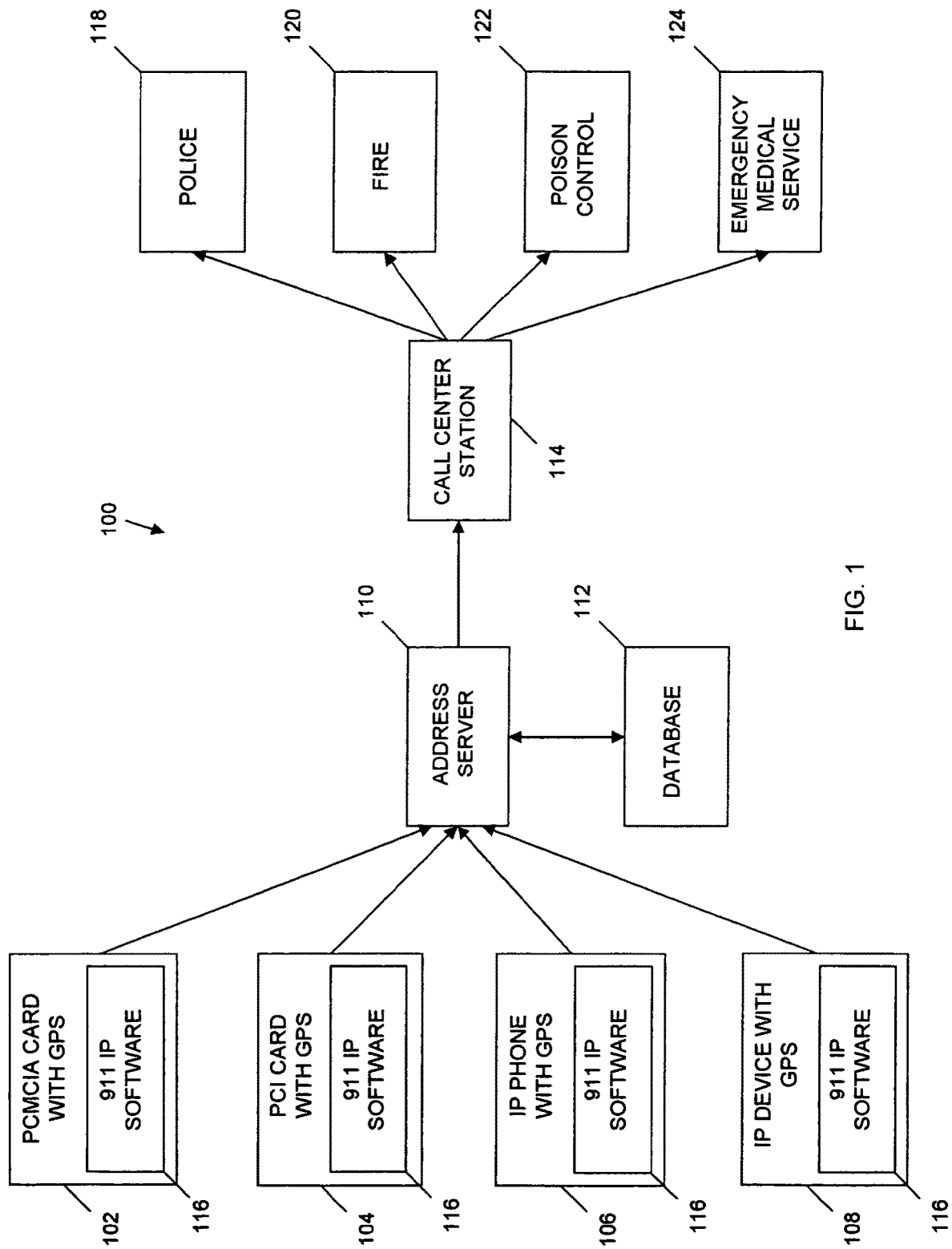
FIG. 1 depicts an IP based 911 system in accordance with one embodiment of the present invention.

Referring now to FIG. 1, an IP based 911 system 100 is depicted in accordance with one embodiment of the present invention. The system 100 includes one or more IP enabled devices 102, 104, 106 and 108, an address server 110, a database 112 and one or more call center stations 114. The IP enabled devices can be a PCMCIA card 102, PCI card 104, IP Phone 106 or other IP enabled device 108 (e.g., a personal data assistant, computer, etc.) all of which are equipped with GPS capability (a GPS component or hardware). In addition, the IP enabled devices 102, 104, 106 or 108 may be part of or attached to another device, such as a computer. Each IP enabled device 102, 104, 106 and 108 is also equipped with an instance of 911 IP software 116, which is also referred to as an emergency IP component. The IP enabled devices 102, 104, 106 and 108 are communicably coupled to the address server 110 via the devices' standard connection to a wide area network, such as the Internet. The address server 110 is communicably coupled to the database 112 via a direct connection, local area network, wide area network or other standard connections. The address server 110 is communicably coupled to the call center station 114 via local area network, wide area network or the Internet. The call center station 114 can place a PSTN direct dial call to any emergency service as is required by the circumstances, such as police 118, fire 120, poison control 122, emergency medical service 124, or other entity.

The 911 IP software 116 monitors the IP enabled device 102, 104, 106 or 108 for one or more emergency criteria, which may include entry of an emergency code, a 911 signal, a panic signal, an emergency activation button, a sensor alarm (e.g., collision, heat, smoke, vital signs, etc.) or an emergency condition specific signal (e.g., fire, police, ambulance, etc.). If the one or more emergency criteria are satisfied, the 911 IP software 116 obtains global positioning data (e.g., vertical and horizontal coordinates, a longitude, a latitude and an altitude for the IP enabled device 102, 104, 106 or 108) from the GPS component and sends an emergency IP request to the address server 110 via the network (not shown). The emergency IP request is SIP request or similar message containing the global positioning data.

Once the address server 110 receives the emergency IP request, the address server 110 obtains local emergency services data based on the global positioning data, dials the call center station 114 (e.g., an emergency services operator, etc.) based on the local emergency services data and passes an emergency call from the IP enabled device 102, 104, 106 or 108 to the call center station 114. The address server 110 may also provide a telephone number for one or more local emergency service providers 118, 120, 122, 124 to the call center station 114 based on the local emergency services data. The local emergency service providers may also include an emergency call center, coast guard, military, federal agency or rescue unit. The address server 110 may also provide the global positioning data to the call center station 114.

Figure 2:
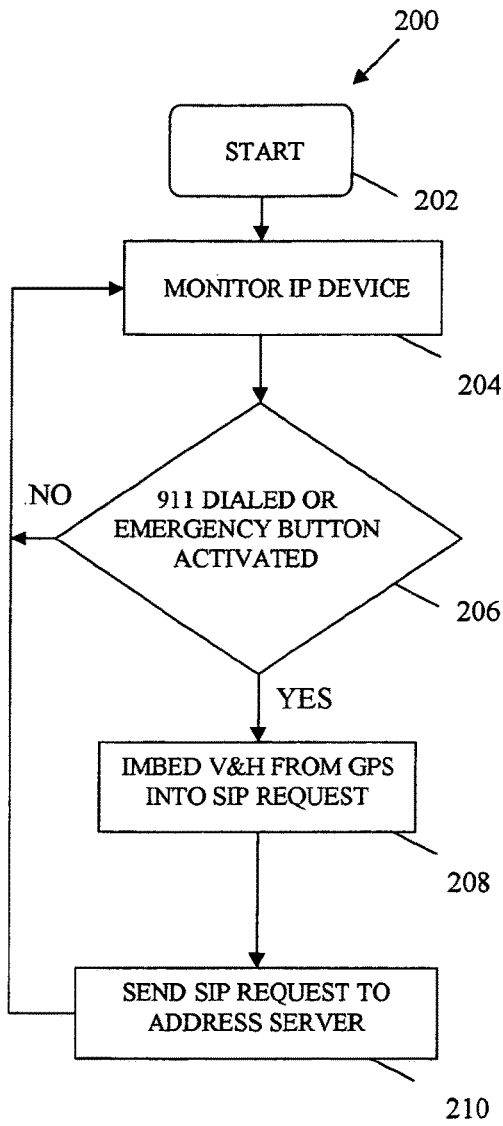
FIG. 2 is a flowchart illustrating the 911 software process in accordance with one embodiment of the present invention.

Now referring to FIG. 2, a flowchart illustrating the 911 software 116 (FIG. 1) process 200 in accordance with one embodiment of the present invention is shown. The 911 software 116 (FIG. 1) 200 or emergency IP component starts in block 202 and monitors the IP enabled device 102, 104, 106 or 108 (FIG. 1) in block 204. Whenever one or more emergency criteria are satisfied, such as the user enters an emergency code, a 911 signal, a panic signal, an emergency activation button, a sensor alarm (e.g., collision, heat, smoke, vital signs, etc.) or an emergency condition specific signal (e.g., fire, police, ambulance, etc.), as determined in decision block 206, the 911 software 116 (FIG. 1) imbeds the global positioning data from the GPS into an emergency IP request or SIP request in block 208 and sends the SIP request to the address server 110 (FIG. 1) in block 210. Thereafter, the process continues to monitor the IP enabled device 102, 104, 106 or 108 (FIG. 1) in block 204 and repeats the process as previously described. If, however, the user does not dial 911 or activate an emergency button, as determined in decision block 206, the 911 software 116 (FIG. 1) continues to monitor the IP enabled device 102, 104, 106 or 108 (FIG. 1) in block 204 and repeats the process as previously described. This method can be implemented as a computer program embedded in a computer readable medium wherein the steps are performed by one or more code segments.

Figure 3:
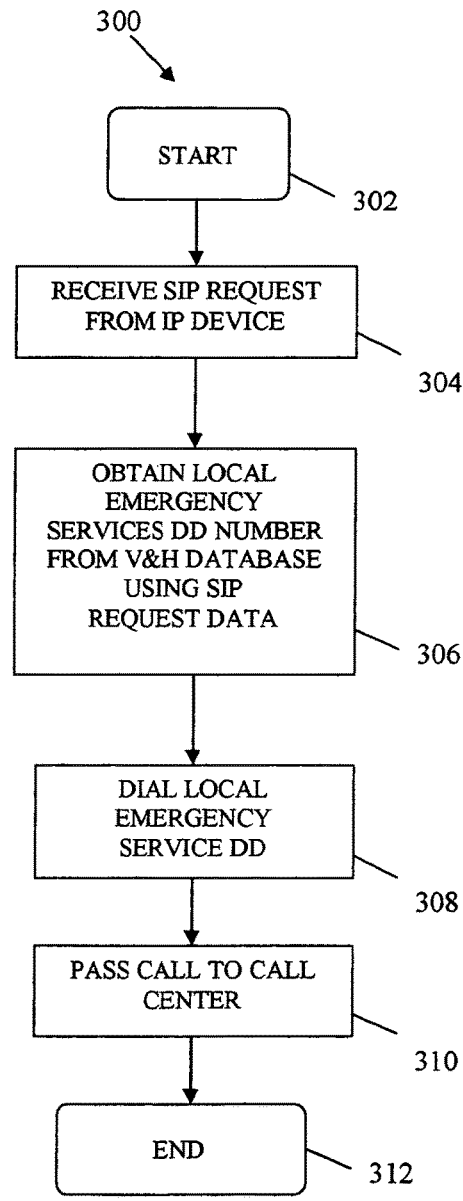
FIG. 3 is a flowchart illustrating the address server process in accordance with one embodiment of the present invention.

Referring now to FIG. 3, a flowchart illustrating the address server 110 (FIG. 1) process 300 in accordance with one embodiment of the present invention is shown. The address server 110 (FIG. 1) process 300 starts in block 302 and receives an emergency IP request or SIP request from an IP enabled device 102, 104, 106 or 108 (FIG. 1) in block 304. The local emergency services data, such as one or more direct dial numbers, is then obtained from the database 112 (FIG. 1) using data contained in the SIP request, such as the global positioning data, in block 306. The address server 110 (FIG. 1) then dials a call center station 114 (FIG. 1) based on the local emergency services data, which may be one of the local emergency service numbers or emergency services operator, in block 308. The emergency call is then passed to the call center station 114 (FIG. 1) in block 310 and ends in block 312. The address server 110 (FIG. 1) may also provides a telephone number for one or more local emergency service providers 118, 120, 122, 124 (FIG. 1) to the call center station 114 (FIG. 1) based on the local emergency services data. In addition, the address server 110 (FIG. 1) may provide the global positioning data to the call center station 114 (FIG. 1). Note that the address server 110 (FIG. 1) may continue to monitor the emergency call. The call center station 114 (FIG. 1) then determines how to handle the emergency call and may route the call to the police 118 (FIG. 1), fire 120 (FIG. 1), poison control 122 (FIG. 1), emergency medical service 124 (FIG. 1) or other appropriate entity (e.g., coast guard, military, federal agency, rescue unit, etc.). This method can be implemented as a computer program embedded in a computer readable medium wherein the steps are performed by one or more code segments.

In other embodiments, the present invention provides software applications that communicate with GPS hardware in communication with IP enabled equipment such that when the equipment is used to access emergency services by entering 911 or pressing an emergency activation button, the software provides the means to determine the location of the calling equipment to the respective emergency service center appropriate to the location of the emergency. More specifically, the software monitors the VoIP software installed on the IP enabled equipment. When 911 is entered, the software acquires the vertical and horizontal coordinates ("V&H") from the GPS hardware, overrides the installed VoIP software to sends a SIP request to an address server which is also monitoring the Internet for these specific sessions. The address server accepts the SIP from the originating hardware, receives the V&H and accesses a database that cross references emergency services direct dial numbers with the V&H. The address server passes the voice call and the available direct dial numbers to a call center that handles emergency voice interface with the person who entered 911 at the originating equipment. The call center operator chooses which emergency service to dial after speaking with the person who has the emergency, or defaults to the fire rescue number.

In other embodiments, the software monitors the VoIP software installed on the IP enabled equipment. When 911 is entered, the software acquires the vertical and horizontal coordinates from the GPS hardware without overriding but interfacing with the installed VoIP software. A request is then sent via a medium (such as an Internet Protocol medium, wireless medium, wireline medium, or a combination of such mediums) to a server which receives the V&H and the related emergency services direct dial number(s). The address server passes the voice call and the available direct dial numbers to a call center that handles emergency voice interface with the person who entered 911 at the originating equipment. The call center operator chooses which emergency service to dial after speaking with the person who has the emergency, or defaults to the fire rescue number.

In further embodiments, the voice call and the available direct dial numbers can be directly sent to a call center and the communication between an individual at the call center and the person who entered 911 at the originating equipment can occur via mediums other than voice (such as text, icons, photos, multi-media information, and/or a combination of voice and these mediums).

Figure 4:
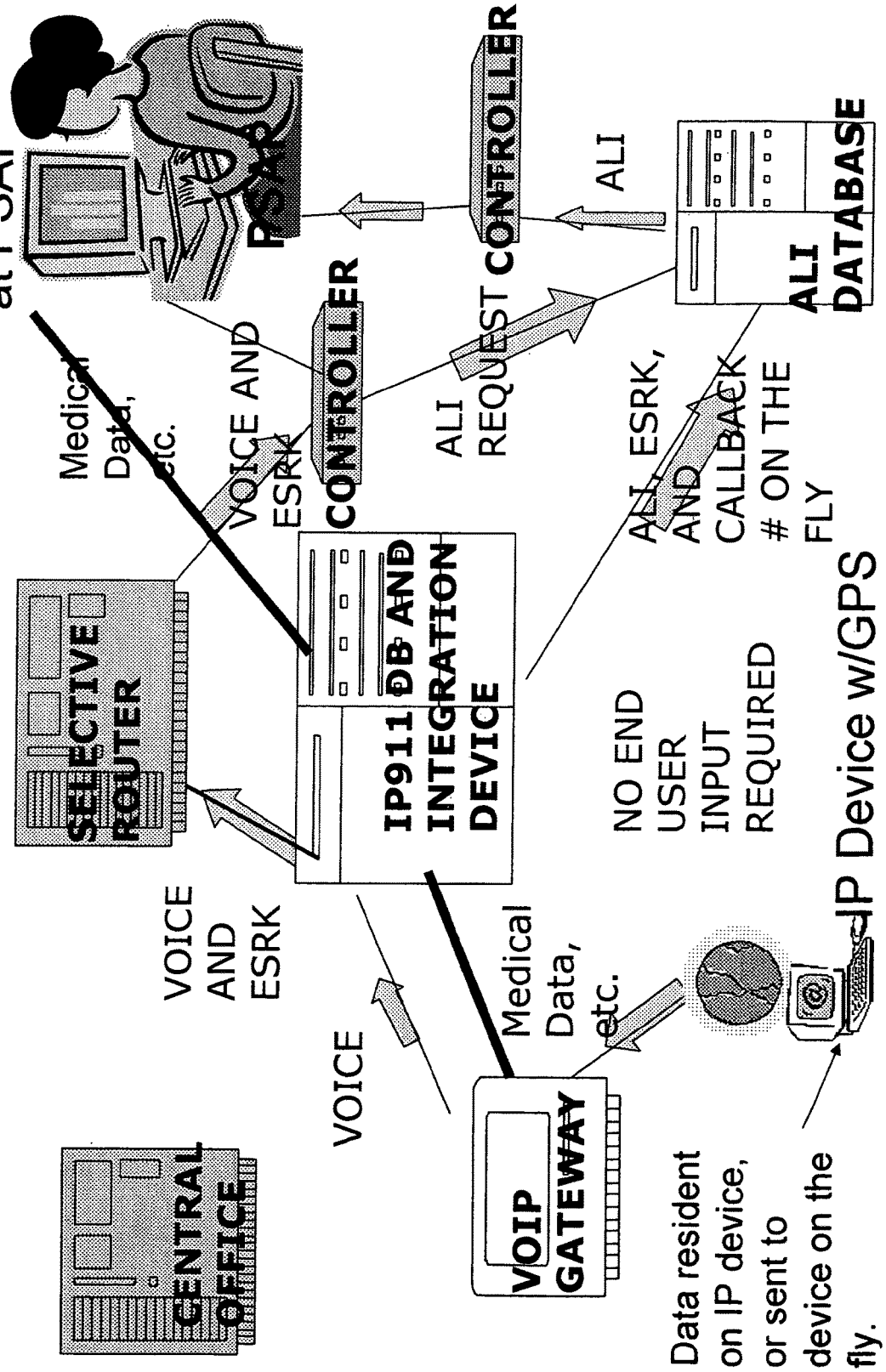
FIG. 4 depicts a second IP based 911 system in accordance with one embodiment of the present invention.

Referring now to FIG. 4, when a PSAP or other emergency center is contacted, if the center is IP equipped, information beyond the normal data considered as 911 relevant (for example, location address and return telephone number) can be transmitted. In such a scenario various data that is available either in a machine at the originating site or stored at other data locations can be transmitted. Such data could be gathered and sent from multiple sources. Such information could include, but is not limited to, directions to the emergency calling location, interior and/or exterior photos of the location; floor plans of the building, medical history of known residents of the location or of the user of the phone, etc. As it relates to the floor plans of the building, the database of the present invention could include complete building drawings including an altitude of ground level (topography) and the spacing of the floors such that the GPS data including altitude (topography) can be used to locate the precise floor of the emergency. The software of the present invention recognizes the monitored emergency signal from the IP device. In addition to the proper routing of the emergency call in general, the software accesses designated data from one or more databases (within the computer acting as the IP calling device, within the VoIP Gateway, or other locations) that has/have been designated to be transmitted with the emergency call including, for example, the proper floor number of a multi floored building. The automatic routing of such data is transmitted in IP format to the emergency center.

Figure 5:
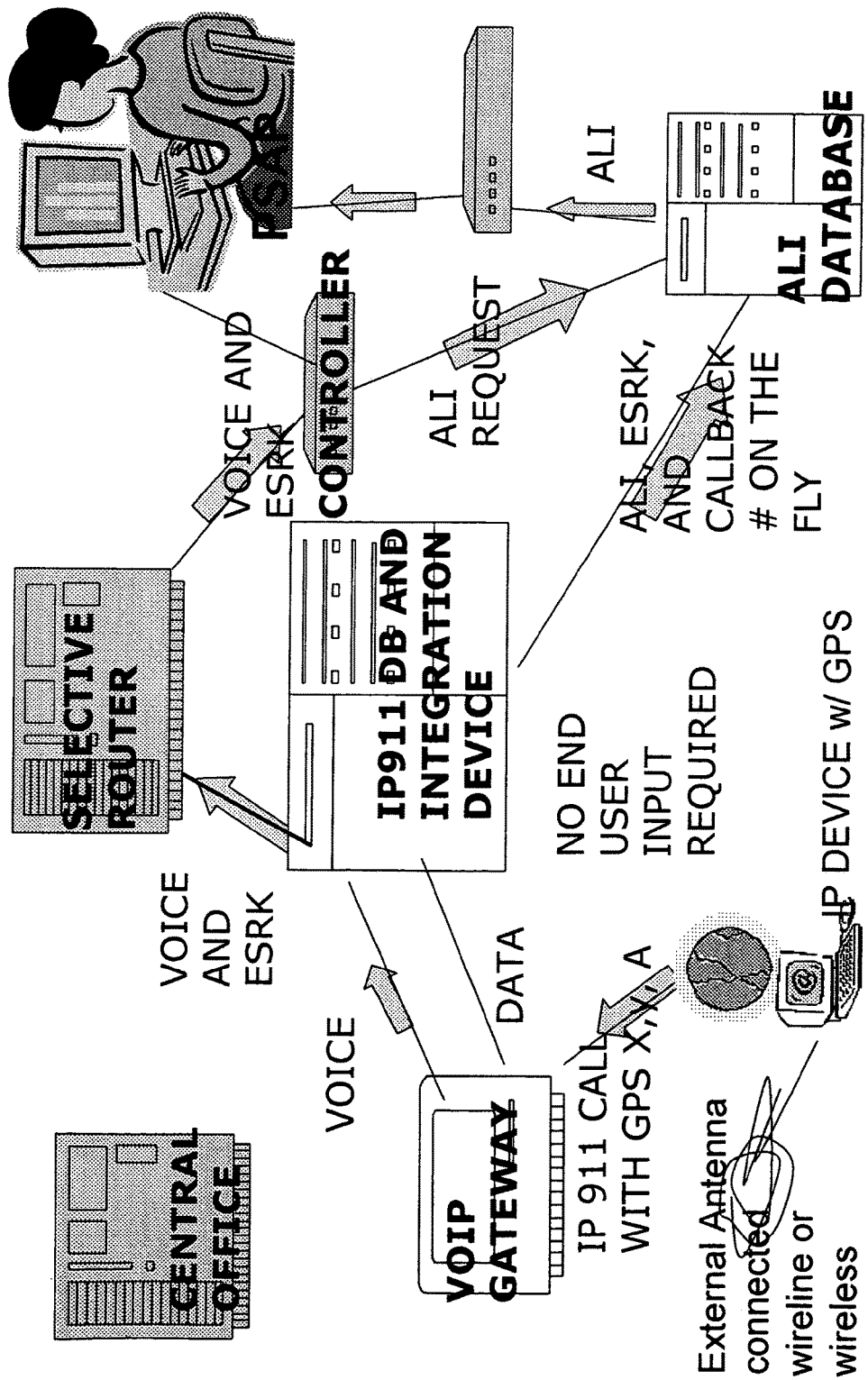
FIG. 5 depicts a third IP based 911 system in accordance with one embodiment of the present invention.

Referring now to FIG. 5, when a PSAP or other emergency center is contacted, if the center is IP equipped, information beyond the normal data considered as 911 relevant (for example, location address and return telephone number) can be transmitted. In such a scenario various data that is available either in a machine at the originating site or stored at other data locations can be transmitted. Such data could be gathered and sent from multiple sources. Such information could include, but is not limited to, references to other antenna, or any kind of sensor (heat, fire, CO2, etc) in proximity to the IP device such as the GPS antenna itself, in building antenna, exterior antenna, blue tooth antenna, CO2 sensing device, etc. Such information could then be sent along the IP call path to the emergency center. This assists in pinpointing the device location particularly in a larger floor plan building, and or assisting the emergency personnel with knowledge that there are specific issues within proximity of the emergency. In addition to the proper routing of the emergency call in general, the software accesses designated data from one or more databases (within the computer acting as the IP calling device, within the VoIP Gateway, or other locations) that has/have been designated to be transmitted with the emergency call including, for example, information related to the antenna signals, sensor signals, etc. The automatic routing of such data is transmitted in IP format to the emergency center.

Figure 6:
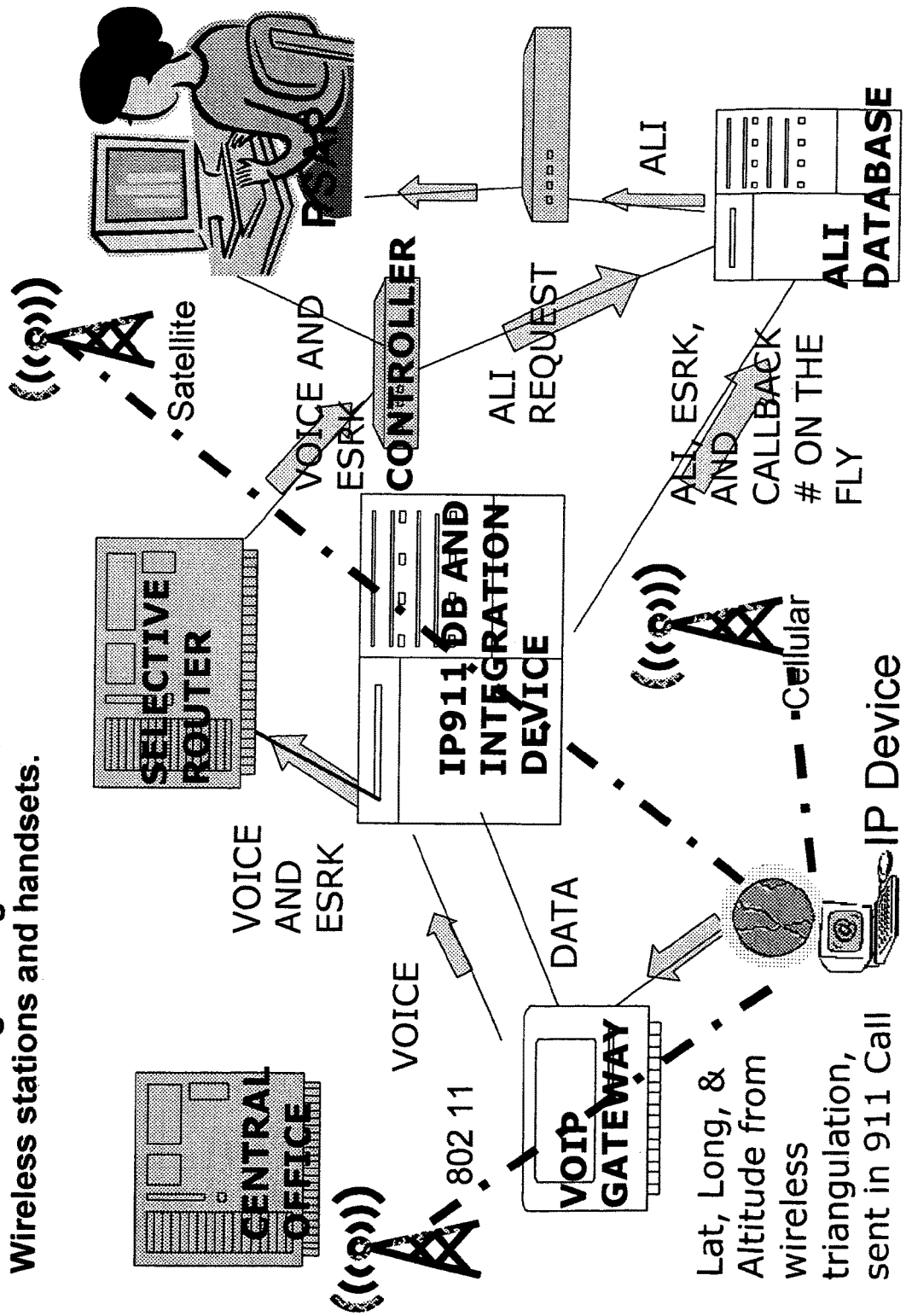
FIG. 6 depicts a fourth IP based 911 system in accordance with one embodiment of the present invention.

Referring now to FIG. 6, when a PSAP or other emergency center is contacted, if the center is IP equipped, information beyond the normal data considered as 911 relevant (for example, location address and return telephone number) can be transmitted. In such a scenario, various data that is available either in a machine at the originating site or stored at other data locations, such as satellite databases, television broadcast information, or 802.11 "hot spot" data, can be transmitted. Such data could be gathered and sent from multiple sources including references to other proximity information relative to the IP device. This could employ triangulation capabilities from one or more sources. Such information could then be sent along the IP call path to the emergency center. This assists in pinpointing the device location particularly in a larger floor plan building. The software of the present invention recognizes the monitored emergency signal from the IP device. In addition to the proper routing of the emergency call in general, the software accesses designated data from one or more databases (within the computer acting as the IP calling device, within the VoIP Gateway, or other locations) containing relational information relative to the aforementioned signals captured that has been designated to be transmitted with the emergency call. The automatic routing of such data is transmitted in IP format to the emergency center.

Figure 7:
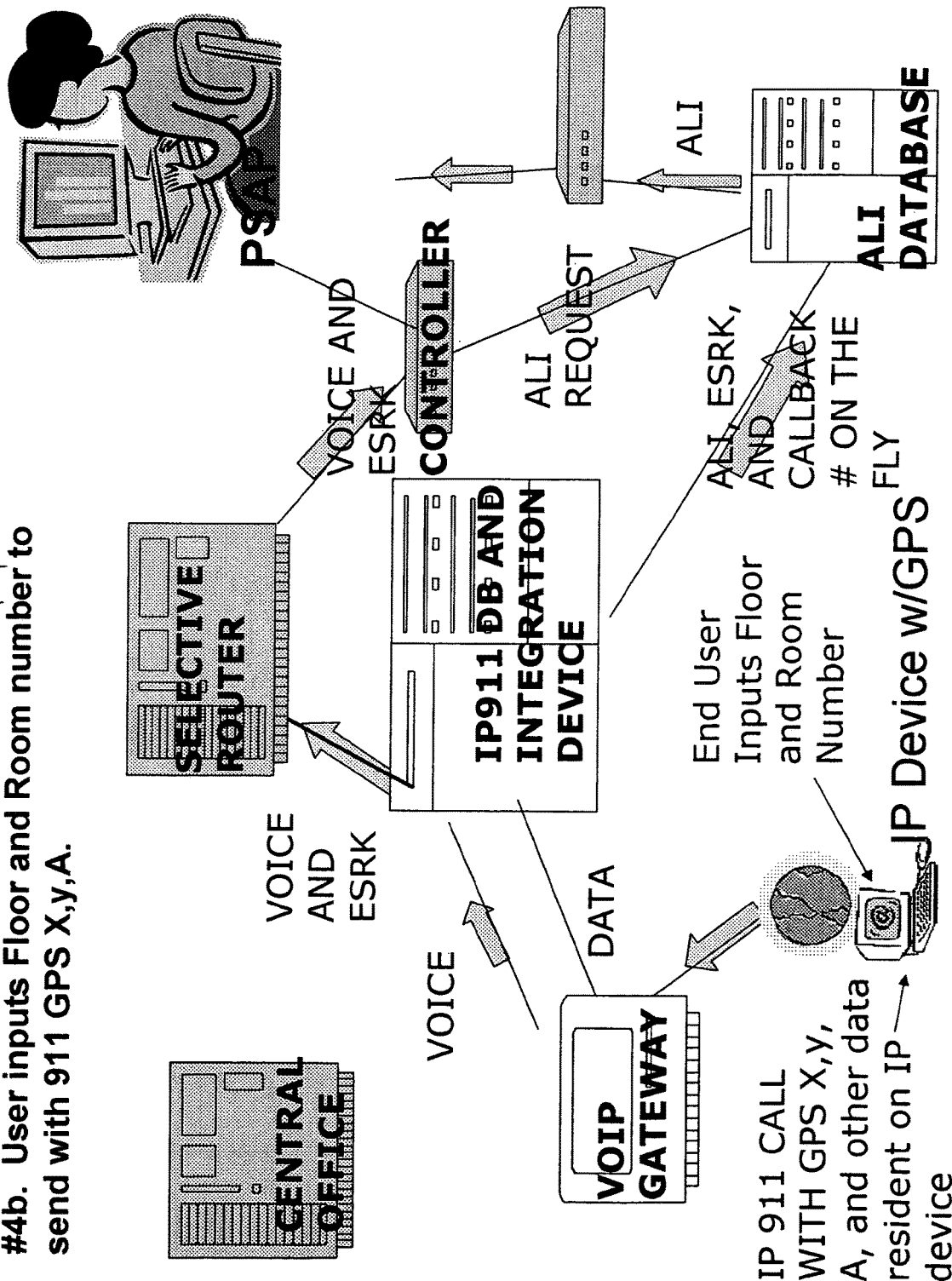
FIG. 7 depicts a fifth IP based 911 system in accordance with one embodiment of the present invention.

Referring now to FIG. 7, when a PSAP or other emergency center is contacted, if the center is IP equipped, information beyond the normal data considered as 911 relevant (for example, location address and return telephone number) can be transmitted. For example, various data that is available either in a machine at the originating site or stored at other data locations can be transmitted. Such data could be gathered and sent from multiple sources including information relative to the IP device that might actually have been entered by the user (or other input methods) such as one or more of the following: a street address, a floor number, an office number, a suite number, user needs, and other related information. Such information could then be sent along the IP call path to the emergency center. This assists in pinpointing the device location, particularly in a larger floor plan building. The software of the present invention recognizes the monitored emergency signal from the IP device. In addition to the proper routing of the emergency call in general, the software accesses designated data from one or more databases (within the computer acting as the IP calling device, within the VoIP Gateway, or other locations) containing relational information relative to the aforementioned signal s captured that has been designated to be transmitted with the emergency call. The automatic routing of such data is transmitted in IP format to the emergency center.

Figure 8:
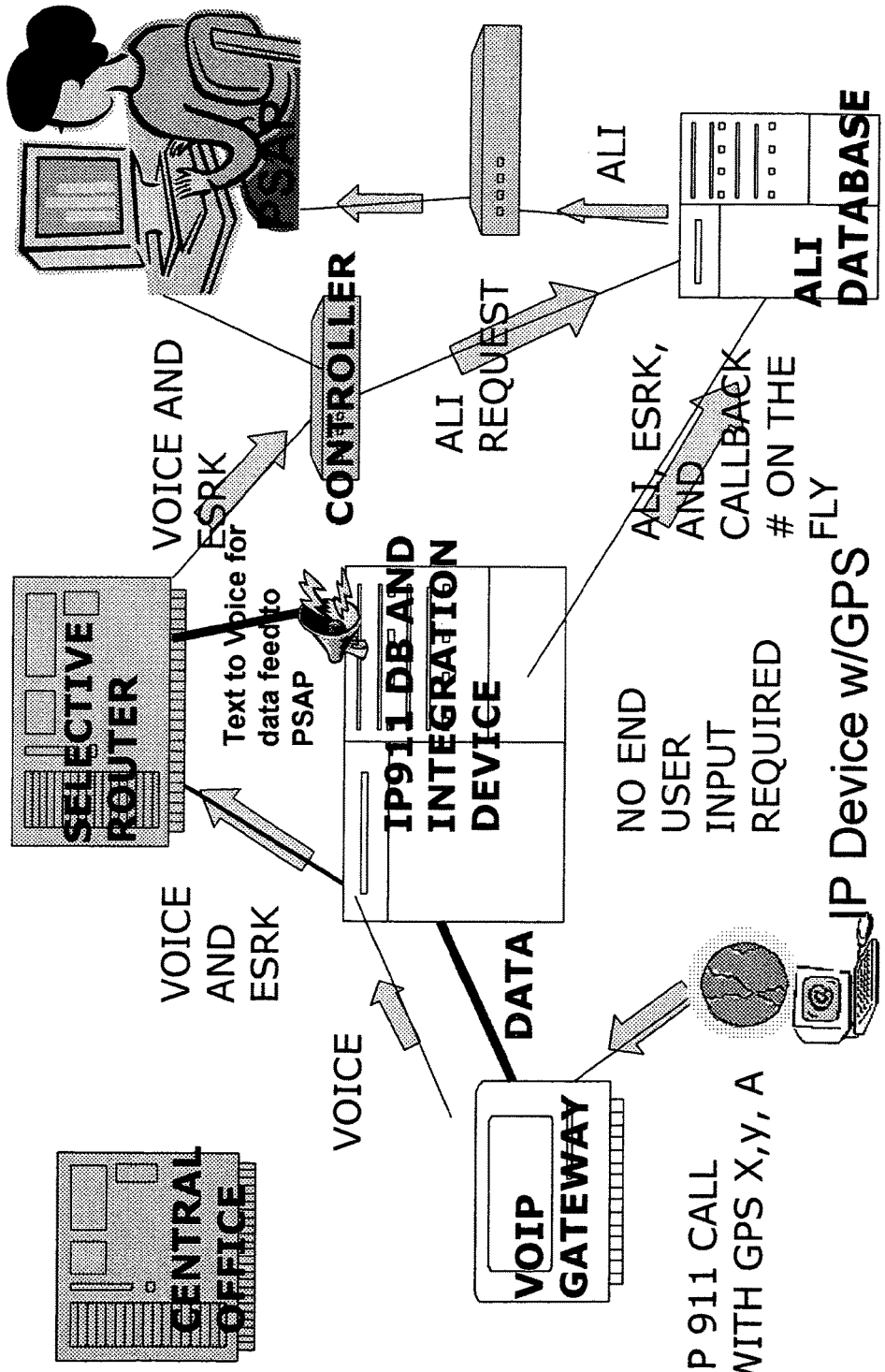
FIG. 8 depicts a sixth IP based 911 system in accordance with one embodiment of the present invention.

Referring now to FIG. 8, when a PSAP or other emergency center is contacted, if the center is IP equipped, information beyond the normal data considered as 911 relevant (for example, location address and return telephone number) can be transmitted. For example, various data that is available either in a machine at the originating site or stored at other data locations, such as in an Interactive Voice Response (IVR) system, can be transmitted. Such data could be gathered and sent from multiple sources including information relative to the IP device such as: a user name, a call back number, medical information, a street address, a floor number, an office number, a suite number, user needs, and other related information. A major concern in an emergency condition is that the individual or individuals who are sending an emergency message may be totally incapacitated. As such, the information gathered from various pertinent sources could be read to the emergency center personnel in a text to speech form such as is generally available in the industry and potentially found with IVR. In one embodiment, the IVR "listens" to the speech path of the originating emergency and if nothing is heard (speech/voice detection, for example) then the IVR system plays, via text to speech, the pertinent/selected data relative to this IP device. In another embodiment, an emergency agent can press a designated key requesting the IVR "read" the text to speech in a speech format. The software of the present invention recognizes the monitored emergency signal from the IP device. In addition to the proper routing of the emergency call in general, the software accesses designated data from one or more databases (within the computer acting as the IP calling device, within the VoIP Gateway, or other locations) containing relational information relative to the aforementioned signals captured that has been designated to be transmitted with the emergency call. The automatic routing of such data is transmitted in IP format to the emergency center.

Figure 9:
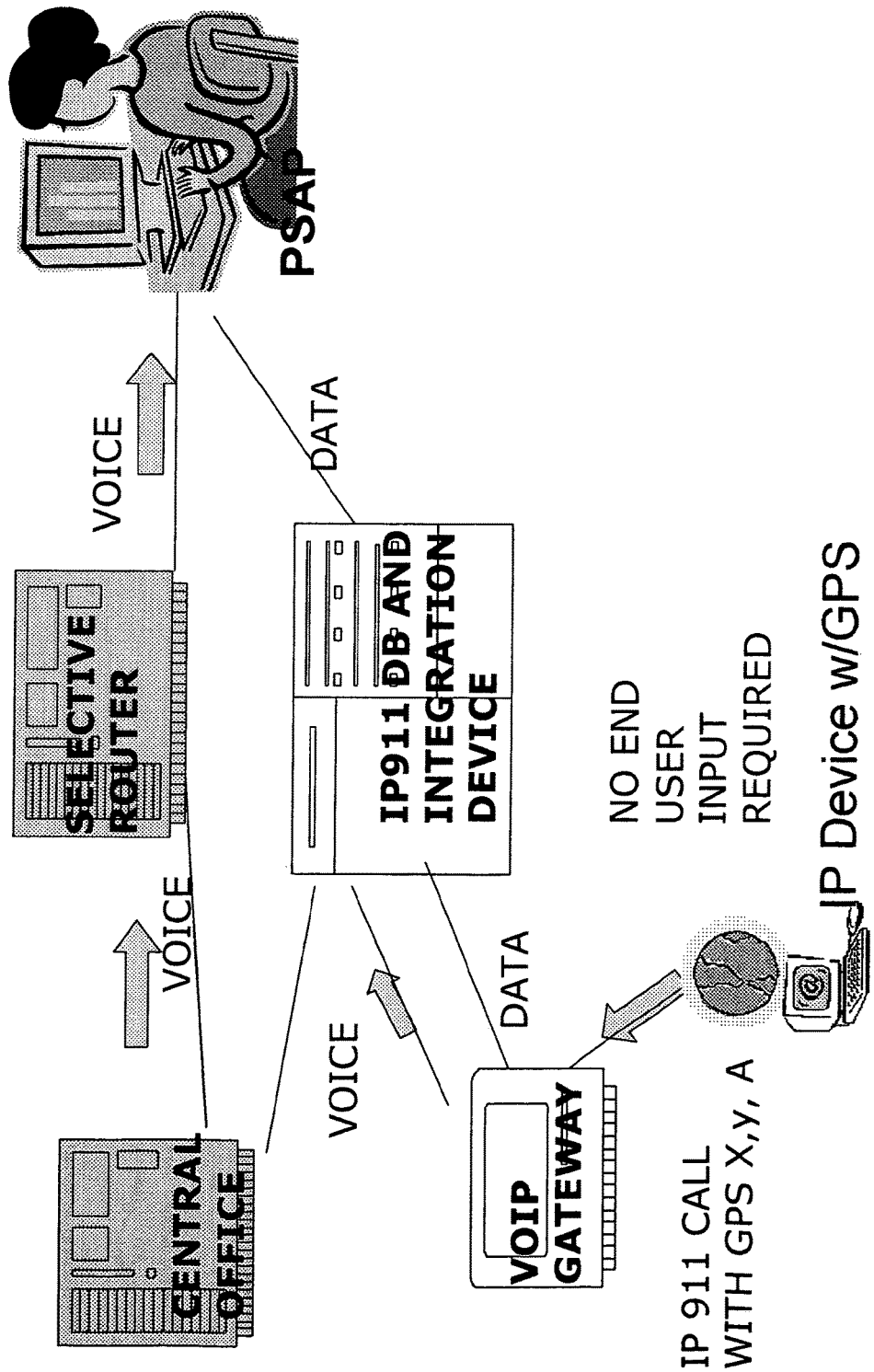
FIG. 9 depicts a seventh IP based 911 system in accordance with one embodiment of the present invention.

Referring now to FIG. 9, when a PSAP or other emergency center is contacted, if the center is IP equipped, information beyond the normal data considered as 911 relevant (for example, location address and return telephone number) can be transmitted. Since the present invention embodies Internet Protocol connections by definition, in contacting a PSAP or other emergency center, no human intervention is required in routing to the proper emergency location. Utilizing a date derived by accessing the GPS information and/or other possible data sources data sources, a database or databases can be accessed to complete the necessary information to properly identify the originating emergency site. This solution embodies input data as previously discussed and transmits it to a database or databases which uses such information such as: latitude, longitude, altitude, triangulation data, external antenna data, and user input. The database then compares a table or tables to identify the precise location of the emergency and the proper emergency center (PSAP) and that center's telephone number (or IP address if IP enabled) from the data available. The software of the present invention recognizes the monitored emergency signal from the IP device, identifies the proper location to send the call and automatically sends the call either via IP or other designated routes. The automatic routing of such data, including the additional information, is transmitted in IP format to the emergency center.

Referring now to FIG. 10, when a PSAP or other emergency center is contacted, if the center is IP equipped, information beyond the normal data considered as 911 relevant (for example, location address and return telephone number) can be transmitted. In one embodiment of the present invention, a PSAP or other emergency center receives information from an intermediary site—a VoIP provisioning center, and if this center is IP equipped, emergency information beyond the normal data considered as 911 relevant (location address and return telephone number) can be sent. The software of the present invention recognizes the monitored emergency signal from the IP device. A voice call is connected to a VoIP provisioning center—either via IP or over traditional landlines, in addition to the proper routing of the emergency call in general, the software accesses designated data from one or more data bases (within the computer acting as the IP calling device, within the VOIP Gateway, or other databases) that has been designated to be transmitted with the emergency call. The VoIP provisioning center can act as an intermediary to the proper emergency center and can "stay on the call" to assist.

Referring now to FIG. 11, when a PSAP or other emergency center is contacted, if the center is IP equipped, information beyond the normal data considered as 911 relevant (for example, location address and return telephone number) can be transmitted. In one embodiment of the present invention, the IP device automatically mandates that the user update their emergency data, i.e. street address, return phone number, etc. If the user does not fill in the required fields, the device will not be enabled for telephone calling or will only be enabled for very limited types of calls (for example, 411 types of calls). The software of the present invention recognizes the monitored emergency signal from the IP device. The system queries the device for user entered data. The databases are then used to locate the proper emergency center for this call. A call is then connected to the correct emergency center. In addition to the proper routing of the emergency call due to user input in general, the software accesses designated data from one or more data bases (within the computer acting as the IP calling device, within the VOIP Gateway, or other databases) that has been designated to be transmitted with the emergency call. This ensures that if the user enters incorrect data, the GPS originated information is still available for the emergency center.

Referring now to FIG. 12, when a PSAP or other emergency center is contacted, if the center is IP equipped, information beyond the normal data considered as 911 relevant (for example, location address and return telephone number) can be transmitted. In one embodiment of the present invention, a voice call is connected to the proper emergency center over a chosen route—either via IP or over traditional landlines.

In other embodiments, directions to the emergency calling location, aerial photos of the location; floor plans of the building, medical history of individuals within a location, etc. As it relates to the floor plans of the building, the database of the present invention could include complete building drawings including known altitude of ground level (topography) and the spacing of the floors. As such, the GPS data including altitude (topography) can be used to locate the precise floor of the emergency.

Although preferred embodiments of the present invention have been described in detail, it will be understood by those skilled in the art that various modifications can be made therein without departing from the spirit and scope of the invention as set forth in the appended claims.

The invention claimed is:
1. An apparatus, comprising:
a first sensor configured to detect an event and generate event information;
a second sensor configured to generate GPS location information; and
a processor configured to receive a signal from the first sensor and the second sensor, and to communicate the signal to an address server via an Internet Protocol;
wherein the address server is configured to receive the signal from the processor, select a remote service provider based in part on the GPS location information of the signal, and to communicate the signal to the remote service provider.
2. The apparatus of claim 1, wherein the processor is further configured to send the GPS location information to an emergency services provider.
3. The apparatus of claim 2, wherein the processor is further configured to communicate the event information embedded with the GPS location information.
4. The apparatus of claim 1, wherein the event is associated with an emergency criterion selected from the group consisting of an emergency code, a 911 signal, a panic signal, an emergency activation button, a sensor alarm, an emergency condition specific signal, and combinations thereof.
5. The apparatus of claim 4, wherein the sensor alarm may be triggered by criteria selected from the group consisting of a collision, heat, smoke, vital signs, carbon monoxide, a police signal, an ambulance signal, an emergency medical service signal, and combinations thereof.
6. The apparatus of claim 1, wherein the address server is further configured to enable or facilitate voice communication with the remote service provider.
7. The apparatus of claim 1, wherein the communications unit utilizes a communications medium selected from the group consisting of an Internet Protocol medium, a wireless medium, a wireline medium, and combinations thereof.
8. A method, comprising:
detecting an event and generating event information at a first sensor;
generating GPS location information at a second sensor;
receiving a signal from the first sensor and the second sensor at a processor;
communicating the signal to an address server via the processor using an Internet Protocol;
receiving the signal from the processor at the address server;
selecting a remote service provider based in part on the GPS location information of the signal; and
communicating the signal to the remote service provider.

9. The method of claim 8, wherein the processor is further configured to send the GPS location information to an emergency services provider.

10. The method of claim 9, wherein the processor is further configured to communicate the event information embedded with the GPS location information.

11. The method of claim 8, wherein the event is associated with an emergency criterion selected from the group consisting of an emergency code, a 911 signal, a panic signal, an emergency activation button, a sensor alarm, an emergency condition specific signal, and combinations thereof.

12. The method of claim 11, wherein the sensor alarm may be triggered by criteria selected from the group consisting of a collision, heat, smoke, vital signs, carbon monoxide, a police signal, an ambulance signal, an emergency medical service signal, and combinations thereof.

13. The method of claim 8, wherein the address server is further configured to enable or facilitate voice communication with the remote service provider.

14. The method of claim 8, wherein the communications unit utilizes a communications medium selected from the group consisting of an Internet Protocol medium, a wireless medium, a wireline medium, and combinations thereof.

15. A non-transitory computer-readable storage medium configured with instructions that are executable by a processor to initiate or perform:
   detecting an event and generating event information at a first sensor;
   generating GPS location information at a second sensor;
   receiving a signal from the first sensor and the second sensor at a processor;
   communicating the signal to an address server via the processor using an Internet Protocol;
   receiving the signal from the processor at the address server;
   selecting a remote service provider based in part on the GPS location information of the signal; and
   communicating the signal to the remote service provider.

16. The non-transitory computer readable storage medium of claim 15, wherein the processor is further configured to send the GPS location information to an emergency services provider.

17. The non-transitory computer readable storage medium of claim 16, wherein the processor is further configured to communicate the event information embedded with the GPS location information.

18. The non-transitory computer readable storage medium of claim 15, wherein the event is associated with an emergency criterion selected from the group consisting of an emergency code, a 911 signal, a panic signal, an emergency activation button, a sensor alarm, an emergency condition specific signal, and combinations thereof.

19. The non-transitory computer readable storage medium of claim 18, wherein the sensor alarm may be triggered by criteria selected from the group consisting of a collision, heat, smoke, vital signs, carbon monoxide, a police signal, an ambulance signal, an emergency medical service signal, and combinations thereof.

20. The non-transitory computer readable storage medium of claim 15, wherein the communications unit utilizes a communications medium selected from the group consisting of an Internet Protocol medium, a wireless medium, a wireline medium, and combinations thereof.

\* \* \* \* \*